United States Patent Office 3,399,149
Patented Aug. 27, 1968

3,399,149
POLYMERIZATION OF OXIRANE MONOEPOXIDES USING AN ORGANOMETALLIC COMPOUND WITH WATER AS COCATALYSTS
Kenneth T. Garty, Somerville, and Thomas B. Gibb, Jr., Murray Hill, N.J., assignors to Union Carbide Corporation, a corporation of New York
No Drawing. Filed July 1, 1959, Ser. No. 824,194
23 Claims. (Cl. 260—2)

This invention relates to the polymerization of oxirane monoepoxide monomers. More particularly, this invention relates to an improved method of polymerizing oxirane monoepoxide monomers whereby relatively high conversions of monomer to polymer are effected in relatively short periods of time.

Polymerization of oxirane monoepoxides in the presence of an organometallic compound, such as dibutyl zinc, which serves as a catalyst for the polymerization reaction, has been found to be desirable as the polymers produced are hard, tough solids which are useful in the manufacture of various shaped articles and in the preparation of film material which can be used in the manufacture of bags, wrapping material, and the like. Moreover, the organometallic compound remaining in the polymer at the termination of the polymerization reaction can be converted into an inert, non-deleterious residue, which can be left in the polymer if so desired, by a simple operation wherein the polymer is contacted with water or an alcohol such as ethyl alcohol. Consequently, solid polymers produced by polymerizing an oxirane monoepoxide in the presence of an organometallic compound do not require any elaborate and time consuming purification operations in order to remove catalyst residue therefrom.

The extensive use of organometallic compounds as catalysts for the polymerization of oxirane monoepoxides to produce solid polymers has been seriously limited, however, due to the relatively long periods of time required in order to obtain any significant polymer yields. In addition, it has not been possible to obtain reproducible yields of solid polymer using organometallic compounds as catalysts. Yields obtained have varied from batch to batch and have been relatively small.

The present invention provides for the production of oxirane monoepoxide polymers by polymerizing a monomeric oxirane monoepoxide and mixtures thereof in the presence of an organometallic compound and also in the presence of a controlled amount of water, which acts as a promoter for the polymerization reaction, whereby relatively high conversions of monomer to polymer are effected in a relatively short period of time. Moreover, the presence of a controlled amount of water in the polymerization reaction allows for reproducibity of polymer yields.

The amount of water employed in the polymerization reaction can vary from about 0.01 to about 1.3 moles per mole of the organometallic compound. Optimum results are achieved at a mole ratio of water to the organometallic compound of about 0.75:1 to about 1:1.

The term "polymer" as used herein is intended to encompass homopolymers, as well as copolymers and interpolymers produced by polymerizing a mixture containing two or more monomeric oxirane monoepoxides.

Organometallics which can be employed as catalysts for the polymerization of oxirane monoepoxides to produce solid polymers are compounds whose compositions can be represented by the formula:

$$R_1\text{—Me—}R_2$$ 

wherein Me is a metal of Group II of the Periodic Table, i.e., beryllium, magnesium, calcium, zinc, strontium, cadmium, barium, mercury, and radium; and wherein $R_1$ and $R_2$ are hydrocarbon radicals such as alkyl, aryl, aralkyl, alkaryl, and cycloalkyl. Particularly desirable organometallics are those compounds having the structural formula noted above wherein $R_1$ and $R_2$ are hydrocarbon radicals having from 1 to 10 carbon atoms and being free from olefinic and acetylenic unsaturation.

Representative $R_1$ and $R_2$ radicals include, among others, methyl, ethyl, propyl, isopropyl, n-butyl, isobutyl, 2-ethylhexyl, dodecyl, octadecyl, phenyl, tolyl, xylyl, benzyl, phenethyl, phenylpropyl, phenylbutyl, cyclopentyl, cyclohexyl, cycloheptyl, 3-propylcyclohexyl, and the like.

Illustrative of organometallic compounds which can be used as catalysts can be noted diethyl zinc, dipropyl zinc, di-n-butyl zinc, dioctadecyl zinc, dicyclohexyl zinc, diphenyl zinc, di-o-tolyl zinc, diethyl magnesium, di-n-butyl magnesium, dioctyl magnesium, diphenyl magnesium, diethyl beryllium, di-n-butyl beryllium, diethyl cadmium, dipropyl cadmium, diisoamyl cadmium, diphenyl cadmium, and the like. The organometallics are known compounds and can be prepared according to the methods described in Berichte 63, 1138 (1934); 59, 931 (1926).

The organometallic compounds are generally used in catalytic amounts, that is, in amounts sufficient to catalyze the polymerization of oxirane monoepoxides to solid polymers. The actual quantity of organometallic compound used can be varied between wide limits, for example, from about 0.01 to about 12 percent by weight and higher, based on the weight of the monomer charged. It is preferred to use an amount of catalyst ranging from about 0.1 to about 3 percent by weight.

The term "oxirane monoepoxide" as used herein is intended to encompass those compounds having a single terminal epoxy group, i.e.:

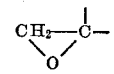

which are free of all other interfering functional groups such as an ester group, an acid group, an amino group, and an aldehyde group.

Among such oxirane monoepoxides can be mentioned the epihalohydrins, such as 1,2-epoxy-3-chloropropane, 1,2-epoxy-3-bromopropane, and the like; the olefin oxides, such as 1,2-epoxyethane, 1,2-epoxypropane 1,2-epoxybutane, 1,2-epoxypentane, 1,2-epoxyhexane 1,2-epoxyheptane, cyclopentene oxide, cyclohexene oxide, 1,2-epoxyphenyl-ethane, 1,2 - epoxy - p - methylphenyl-ethane, 1,2-epoxy-o-chlorophenyl ethane, and the like; epoxy-alkyl ethers, such as those having the structural formula

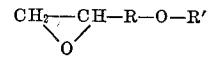

wherein R' is a hydrocarbon radical such as alkyl, aryl, alkaryl, aralkyl, and the like, and wherein R is a saturated aliphatic hydrocarbon radical. Particularly desirable polymers are those produced by polymerizing a monomer having the structural formula noted above wherein R contains from 1 to 4 carbon atoms and R' is a phenyl or alkyl substituted phenyl radical wherein the alkyl substituent contains up to 12 carbon atoms. Illustrative radicals for R include, among others, methylene, ethylene, propylene, butylene, hexylene, octylene, and the like. Representative radicals for R' include, among others, phenyl, 2-, 3-, and 4-methylphenyl, 4-isopropylphenyl, 4-tertiarybutylphenyl, 4-octylphenyl, ethyl, propyl, butyl, amyl, and the like.

Suitable epoxyalkyl ethers include the following: 1,2-epoxy-3-phenoxy-propane, 1,2-epoxy - 4 - phenoxy-butane, 1,2-epoxy-5-phenoxy-pentane, 1,2-epoxy-6-phenoxy - hexane, 1,2-epoxy-3-(o-methylphenoxy)-propane, 1,2-epoxy-3-(m-methylphenoxy)-propane, 1,2-epoxy - 3 - (p-methylphenoxy)-propane, 1,2-epoxy - 3 - (o-isopropylphenoxy)-propane, 1,2-epoxy-3-(p-tertiary butylphenoxy)-propane, 1,2 - epoxy - 3-(p-octylphenoxy)-propane, 1,2-epoxy-3-(o-chlorophenoxy) - propane, 1,2 - epoxy - 3 - (o-chlorophenoxy)-propane, 1,2-epoxy-3-(2,4-dimethylphenoxy) - propane, 1,2-epoxy - 3 - (2,3-dimethylphenoxy)-propane, 1,2-epoxy-3-(2,6-dimethylphenoxy)-propane, 1,2-epoxy-3-(2-chloro-4-methylphenoxy)-propane, 1,2 - epoxy-3-(o-amylphenyl)-propane, 1,2-epoxy-4-(o-methylphenoxy)-butane, 1,2-epoxy-4-(2,4-dimethylphenoxy)-butane, 1,2 - epoxy-4-(2,5-dimethylphenoxy)-butane, 1,2-epoxy-4-(2,4-dichlorophenoxy)-butane, 1,2-epoxy-4-(2,5 - dichlorophenoxy)-butane, 1,2-epoxy-6-phenoxy-hexane, 1,2-epoxy - 6 - (2,3-dibromophenoxy)-hexane, and the like.

The polymerization reaction is conducted by charging an oxirane monoepoxide monomer or mixture of monomers, an organometallic compound and a controlled amount of water in a reaction vessel and generally subjecting the reaction vessel to heat. Actually, the temperature at which the polymerization reaction is conducted can be varied over a wide temperature range, from about 0° C. to about 200° C., and, if desired, even higher. A temperature in the range of about 60° C. to about 175° C. is most preferred.

It is also preferred to conduct the polymerization reaction in the presence of an organic diluent which is nonreactive with respect to the monomer, catalyst, and polymer, is a solvent for the monomer and catalyst mixture, but a non-solvent for the polymer. During the polymerization reaction, particularly whenever about 50 percent or more of the monomer is converted to the polymer, the reaction mixture becomes highly viscous. If a diluent is not present, it is difficult to remove the heat of reaction which, if not removed, might cause undesirable side reactions to occur. In addition, the use of a diluent facilitates removal of unreacted monomer from the polymer.

Illustrative of suitable organic diluents can be noted the aromatic hydrocarbons, such as benzene, chlorobenzene, toluene, xylene, and the like; cycloaliphatics, such as cyclopentane, cyclohexane, isopropyl cyclohexane, and the like; alkoxy compounds, such as methoxybenzene and the like; the dimethyl and diethyl ethers of ethylene glycol, propylene glycol, diethylene glycol; aliphatics, i.e. hexane.

The diluent can be added prior to the commencement of the polymerization reaction or during the polymerization reaction in amounts of from about 5 to 90 parts by weight per 100 parts by weight monomer and diluent.

The polymerization reaction is preferably conducted under an inert atmosphere, e.g., nitrogen, and can be under atmospheric, sub-atmospheric, or super-atmospheric pressures.

The time required to polymerize an oxirane mono-epoxide to produce a solid polymer will vary and depend upon a number of factors such as the temperature at which the polymerization reaction is being conducted, the amount of and nature of the organometallic catalyst used, and also upon the nature of the monomer employed. Using water as a promoter in accordance with the present invention, relatively high yields of polymer have been obtained in as short a time as four hours.

The crude product resulting from the polymerization reaction usually contains, in addition to the solid polymer, some unreacted monomer, and also catalyst residue. Removal of the unreacted monomer and catalyst residue can be accomplished by any convenient manner. If desired, the catalyst residue can be left in the polymer after first treating the polymer with water or an alcohol, such as ethyl alcohol. For instance, when dibutyl zinc is the catalyst used and it is desired to allow the catalyst residue to remain in the polymer, the polymer is conveniently treated with ethyl alcohol whereby the catalyst is converted to its oxide, which oxide is inert and does not have any deleterious effect on the polymer. The ethyl alcohol is driven from the polymer by applying heat thereto.

When it is desired to remove both unreacted monomer and catalyst residue from the polymer produced, as for example poly(1,2-epoxy-3-phenoxy-propane), the crude product is dispersed in a mixture of acetone and hydrochloric acid, the dispersion is then filtered, thereby obtaining the polymer as a filter cake and, if necessary, then washing the polymer with small amounts of ethyl alcohol to obtain a white colored solid. Unreacted monomer and catalyst residue can be removed from a polymer such as poly(1,2-epoxyethane) by dissolving the crude product in ethyl alcohol, filtering off the catalyst residue, concentrating the solution to remove the alcohol and recovering the polymer. In general, it is desirable to remove the unreacted monomer from the crude product as the polymer recovered exhibits enhanced thermal and dimensional stability.

The percent conversion of monomer to polymer as noted herein was determined by removing the unreacted monomer and catalyst residue from the polymer, drying the polymer to a constant weight at a temperature of from about 50° C. to 60° C. under a pressure of 25 mm. Hg, weighing the polymer, dividing the weight of the polymer by the weight of the monomer charged, and multiplying by 100.

In the following examples, which are illustrative of the present invention and not intended to limit the scope thereof in any manner, the reduced viscosity measurements, which are a measure of the molecular weight, were made as follows.

A 0.05 gram sample of polymer was weighed into a 25 ml. volumetric flask and p-chlorophenol containing 2 percent by weight pinene added thereto. The flask was heated for 30 minutes in an oil bath maintained at 140° C. with intermittent swirling. After solution was complete, additional p-chlorophenol containing 2 percent by weight pinene was added to produce a 25 ml. solution while maintaining the flask in a 47° C. constant temperature bath. The solution was thereafter filtered through a sintered glass funnel and the viscosity of a 3 ml. sample determined in a Cannon viscometer at about 47° C.

Reduced viscosity was computed by use of the equation:

$$RV = \frac{ts - to}{cto}$$

where:

$to$ is the efflux time for the solvent
$ts$ is the efflux time for the polymer solution
$c$ is the concentration of the solution in terms of grams of polymer per 100 ml. of solution Example 1

To each of two Pyrex glass tubes which had been flushed out with nitrogen gas there was charged 7.33 grams of 1,2-epoxy-3-phenoxy-propane and a solution of 0.11 gram of dibutyl zinc in 21.2 ml. of toluene. To one of the tubes there was also added 0.01 gram of water. Both tubes were provided with a nitrogen gas atmosphere, sealed, and heated at 90° C. for four hours in an air circulating oven. Each tube was then broken open and the contents thereof were transferred to a Waring Blendor using 200 ml. of a mixture (50–50 on a volume basis) of acetone and toluene acidified with 5 ml. of 1 N hydrochloric acid. After thorough agitation in the Waring Blendor, the mixture was poured into ethyl alcohol. The amount of ethyl alcohol was 100 times the volume of the mixture. The polymer precipitated out of the ethyl alcohol and was recovered as a filter cake. The polymer was then washed with small quantities of ethyl alcohol, dried at 60° C. for 24 hours under a pressure of 25 mm. Hg and then dried an additional 24 hours at a temperature of from 40° C.–60° C. and a pressure of 25 mm. Hg.

The percent conversion of monomer to polymer, the mole ratio of water to dibutyl zinc, the reduced viscosity of the polymer obtained, and the amount of catalyst, i.e. dibutyl zinc, used are noted in the table below.

|  | Control | 1 |
|---|---|---|
| Mole ratio of water to dibutyl zinc | 0 | 1:1 |
| Percent by weight catalyst | 1.5 | 1.5 |
| Percent conversion | 0.66 | 39.9 |
| Reduced viscosity | | 14 |

The white colored polymer obtained in accordance with this invention was hard, tough, insoluble in water, and at room temperature insoluble in methanol, ethanol, diethyl ether, dioxane, acetone, methyl ethyl ketone, ethyl acetate, tetrahydrofuran, chloroform, methylene chloride, carbon disulfide, benzene, toluene, and xylene.

The 1,2-epoxy-3-phenoxy-propane used in this and in subsequent examples was purified by fractional distillation so that gas chromatographic survey showed only one major peak, that of the 1,2-epoxy-3-phenoxy-propane. Toluene used in this and subsequent examples was distilled over sodium.

Example 2

To each of two Pyrex tubes which had been flushed out with nitrogen gas there was charged 7.43 grams of 1,2-epoxy-3-phenoxy-propane and a solution of 0.13 gram of dibutyl zinc in 21.2 ml. of toluene. To one of the tubes there was also added a sufficient amount of water to provide a mole ratio of water to dibutyl zinc of 1:1. Both tubes were provided with a nitrogen gas atmosphere, sealed, and heated at 90° C. for four hours in an air circulating oven. A white colored polymer was recovered from each tube as described in Example 1.

|  | Control | 1 |
|---|---|---|
| Mole ratio of water to dibutyl zinc | 0 | 1:1 |
| Percent by weight catalyst | 1.75 | 1.75 |
| Percent conversion | 1 | 49 |
| Reduced viscosity | | 14 |

Example 3

To each of two Pyrex tubes which had been flushed out with nitrogen gas there was charged 7.4 grams of 1,2-epoxy-3-phenoxy-propane and a solution of 0.17 gram of dibutyl zinc in 21.2 ml. of toluene. To one of the tubes there was also added a sufficient amount of water to provide a mole ratio of water to dibutyl zinc of 1:1. Both tubes were provided with a nitrogen gas atmosphere, sealed, and heated at 90° C. for four hours in an air circulating oven. A white colored polymer was recovered from each tube as described in Example 1.

|  | Control | 1 |
|---|---|---|
| Mole ratio of water to dibutyl zinc | 0 | 1:1 |
| Percent by weight catalyst | 2.3 | 2.3 |
| Percent conversion | 0.8 | 52 |
| Reduced viscosity | | 11 |

Example 4

To each of two Pyrex tubes which had been flushed out with nitrogen gas there was charged 7.59 grams of 1,2-epoxy-3-phenoxy-propane and a solution of 0.25 gram of dibutyl zinc in 21.2 ml. of toluene. To one of the tubes there was also added a sufficient amount of water to provide a mole ratio of water to dibutyl zinc of 1:1. Both tubes were provided with a nitrogen gas atmosphere, sealed, and heated at 90° C. for four hours in an air circulating oven. A white colored polymer was recovered from each tube as described in Example 1.

|  | Control | 1 |
|---|---|---|
| Mole ratio of water to dibutyl zinc | 0 | 1:1 |
| Percent by weight catalyst | 3.3 | 3.3 |
| Percent conversion | 1 | 61 |
| Reduced viscosity | | 9.6 |

Using diphenyl zinc in lieu of the dibutyl zinc effected the same results as noted in the table above.

Example 5

To each of a series of Pyrex tubes which had been flushed out with nitrogen gas there was charged 1,2-epoxy-3-phenoxy-propane, water and a solution of dibutyl zinc in toluene. Each tube contained 7.33 grams of 1,2-epoxy-3-phenoxy-propane, 0.11 gram of dibutyl zinc, 21.2 ml. of toluene and various amounts of water as indicated in the table below. Each tube was provided with a nitrogen gas atmosphere, sealed, and heated at 90° C. for 24 hours in an air circulating oven. A white colored polymer was recovered from each tube in a manner described in Example 1. A control was run in the same manner with the exception that no water was added thereto.

|  | Control | 1 | 2 | 3 | 4 | 5 |
|---|---|---|---|---|---|---|
| Mole ratio of water to dibutyl zinc | 0 | 0.25:1 | 0.50:1 | 0.75:1 | 1:1 | 1.25:1 |
| Percent by weight catalyst | 1.5 | 1.5 | 1.5 | 1.5 | 1.5 | 1.5 |
| Percent conversion | 1.5 | 19.9 | 65.6 | 95.4 | 97 | 3.1 |
| Reduced viscosity | | 6.4 | 10.1 | 10.6 | 7.8 | 0.7 |

Example 6

This example illustrates that the use of water as a promoter allows for reproducibility of polymer yields.

To a Pyrex tube which had been flushed out with nitrogen gas, identified as Tube 1, there was charged 7.33 grams of 1,2-epoxy-3-phenoxy-propane, 8.3 milligrams of water, and a solution 0.11 gram of dibutyl zinc in 21.2 ml. of toluene. The tube was sealed under a nitrogen gas atmosphere and heated for 24 hours at 90° C. in an air circulating oven. A white colored polymer was recovered in a manner described in Example 1.

To a second Pyrex tube which had been flushed out with nitrogen, identified as Tube 2, there was charged 300 grams of 1,2-epoxy-3-phenoxy-propane, 700 grams of heptane which had been refluxed for 20 hours over sodium and thereafter distilled over, 4.5 grams of dibutyl zinc, and 0.34 grams of water. The tube was sealed under a nitrogen gas atmosphere and heated for 24 hours at 90° C. The tube was then broken open and the crude produce recovered as follows. The crude product was transferred to a Waring Blendor by means of 2 liters of toluene and thoroughly agitated therein. The mixture was then poured into 2 liters of ethanol wherein the polymer precipitated out and recovered. The polymer was dried for four hours at 25° C. under a pressure of 15–20 mm. Hg, then dried at 50° C. under a pressure of 15–20 mm. Hg and recovered as a white colored solid.

The mole ratio of water to dibutyl zinc, percent by weight catalyst, and percent conversion in each case is noted in the table below:

|  | Tube 1 | Tube 2 |
|---|---|---|
| Mole ratio of water to dibutyl zinc | 0.75:1 | 0.75:1 |
| Percent by weight catalyst | 1.5 | 1.5 |
| Percent conversion | 95.4 | 95.4 |

Example 7

A number of reaction mixtures were prepared in a series of Pyrex glass tubes which had been flushed out with nitrogen gas. Each reaction mixture was polymerized under a nitrogen gas atmosphere in a manner described in Example 5. Each mixture comprised 1,2-epoxy-3-phenoxy-propane, toluene in an amount to provide a ratio of toluene to epoxide of 60:40. Ratio of catalyst to water in each tube is noted in the following table as well as the percent conversion of monomer to polymer and percent by weight dibutyl zinc.

The white colored polymer was recovered from each tube in a manner described in Example 1.

|  | Control 1 | 1 | Control 2 | 2 | Control 3 | 3 |
|---|---|---|---|---|---|---|
| Mole ratio of water to dibutyl zinc | 0 | 1:1 | 0 | 1:1 | 0 | 1:1 |
| Percent by weight catalyst | 5 | 5 | 9 | 9 | 12 | 12 |
| Percent conversion | 1 | 65.5 | 1.2 | 67.4 | 1.3 | 69.7 |

Example 8

To each of two Pyrex tubes flushed out with nitrogen gas there was charged 1,2-epoxypropane, water, and a solution of dibutyl zinc in toluene in the amounts indicated below in the table. The tubes were sealed under a nitrogen gas atmosphere and heated for 24 hours at 90° C. The tubes were then broken open and the crude product washed into a weighted evaporating dish. The dish, containing the crude product, was heated in a steam bath for seven hours and then heated for 16 hours at 42° C. under a vacuum of 20 mm. Hg. Amount of solid polymer recovered is also indicated below.

|  | Control | 1 |
|---|---|---|
| Grams of 1,2-epoxypropane | 5 | 5 |
| Grams of toluene | 7.5 | 7.5 |
| Grams of dibutyl zinc | 0.075 | 0.075 |
| Grams of water | 0 | 0.0056 |
| Mole ratio of water to dibutyl zinc | 0 | 0.75:1 |
| Grams of polymer obtained | 1.605 | 4.355 |
| Percent conversion | 32.1 | 87.1 |
| Reduced viscosity | 2.4 | 4.6 |

1,2-epoxypropane used was distilled over KOH and then fractionally distilled at atmospheric pressure.

Example 9

To each of two Pyrex tubes flushed out with nitrogen gas there was charged 1,2-epoxy-3-chloropropane, water, and a solution of dibutyl zinc in toluene, in amounts indicated below in the table. The tubes were sealed under a nitrogen gas atmosphere and heated for 24 hours at 90° C. The crude product was treated as described in Example 8 with the exception that the heating treatment under vacuum was conducted at 55° C. for 65 hours. Amount of solid polymer recovered is indicated below.

|  | Control | 1 |
|---|---|---|
| Grams of 1,2-epoxy-3-chloropropane | 10 | 10 |
| Grams of toluene | 15 | 15 |
| Grams of dibutyl zinc | 0.15 | 0.15 |
| Grams of water | 0 | 0.0113 |
| Mole ratio of water to dibutyl zinc | 0 | 0.75:1 |
| Grams of polymer obtained | 0.1878 | 0.8674 |
| Percent conversion | 1.9 | 8.7 |

1,2-epoxy-3-chloropropane used in this example was fractionally distilled under reduced pressure of 25 mm. Hg.

Example 10

To each of two Pyrex tubes which had been flushed out with nitrogen gas there was added 10 grams of 1,2-epoxyethane, 10 ml. of heptane and various amounts of water and dibutyl zinc as indicated in the table below. Each tube was sealed under a nitrogen gas atmosphere and heated at 90° C. in an air circulating oven for 24 hours. Polymer was recovered from each tube in a manner described in Example 8.

|  | Control | 1 |
|---|---|---|
| Grams of dibutyl zinc | 0.15 | 0.15 |
| Grams of water | 0 | 0.015 |
| Mole ratio of water to dibutyl zinc | 0 | 1:1 |
| Grams of polymer obtained | 0.1 | 2 |
| Percent conversion | 1 | 20 |

The 1,2-epoxyethane used in this example was dried by passing it over a KOH column and then passing it through two columns of activated alumina.

Example 11

To each of 5 Pyrex tubes which had been flushed out with nitrogen gas there was added 1,2-epoxy-3-phenoxypropane, 1,2-epoxyethane, water, and dibutyl zinc in amounts noted in the table below. Each tube was sealed under a nitrogen atmosphere and heated at 90° C. in an air circulating oven for 24 hours. Polymer was removed from each tube with acetone and recovered by evaporating the unreacted monomers and solvents therefrom by heating at 150° C. under a vacuum of 0.1 mm. of Hg.

|  | 1 | 2 | 3 | 4 | 5 |
|---|---|---|---|---|---|
| Grams of water | 0.0113 | 0.0113 | 0.0113 | 0.0113 | 0.0113 |
| Grams of dibutyl zinc | 0.15 | 0.15 | 0.15 | 0.15 | 0.15 |
| Mole ratio of water to dibutyl zinc | 0.75:1 | 0.75:1 | 0.75:1 | 0.75:1 | 0.75:1 |
| Grams of 1,2-epoxyethane | 0.88 | 1.76 | 2.64 | 3.52 | 0 |
| Grams of 1,2-epoxy-3-phenoxy-propane | 12 | 9 | 6 | 3 | 15 |
| Mole ratio of 1,2-epoxyethane to 1,2-epoxy-3-phenoxy-propane | 1:4 | 2:3 | 3:2 | 4:1 | 0 |
| Percent conversion | 65.1 | 55.7 | 83.3 | 72 | 90 |

What is claimed is:

1. Method for the production of a polymer of an epoxide compound which comprises contacting a monomeric oxirane monoepoxide, which is free of ester, acid, amino and aldehyde groups, with at least about 0.01 percent by weight, based on the weight of said oxirane monoepoxide, of an organometallic compound having the formula:

$$R_1-Me-R_2$$

wherein $R_1$ and $R_2$ are hydrocarbon radicals and Me is a metal of Group II of the Periodic Table, and with from about 0.01 to about 1.3 moles of water, per mole of said organometallic compound, whereby said oxirane monoepoxide polymerizes to form a polymer.

2. Method as defined in claim 1 wherein the temperature at which the said oxirane monoepoxide is polymerized is from about 60° C. to about 175° C.

3. Method as defined in claim 1 wherein the said organometallic compound is used in an amount of from about 0.01 to about 12 percent by weight based on the weight of the said oxirane monoepoxide.

4. Method as defined in claim 1 wherein the said organometallic compound is dibutyl zinc.

5. Method as defined in claim 1 wherein the said organometallic compound is diphenyl zinc.

6. Method as defined in claim 1 wherein the said oxirane monoepoxide is 1,2-epoxy-3-phenoxy-propane.

7. Method as defined in claim 1 wherein the said oxirane monoepoxide is 1,2-epoxypropane.

8. Method as defined is claim 1 wherein the said oxirane monoepoxide is 1,2-epoxy-3-chloropropane.

9. Method as defined in claim 1 wherein the said oxirane monoepoxide is 1,2-epoxyethane.

10. Method as defined in claim 1 wherein the said water is present in an amount of about 0.75 to about 1 mole per mole of the said organometallic compound.

11. Method as defined in claim 1 wherein the temperature at which the said oxirane monoepoxide is polymerized is from about 0° C. to about 200° C.

12. Method as defined in claim 1 wherein the said organometallic compound is used in an amount of from about 0.1 to about 3 percent by weight, based on the weight of said monoepoxide.

13. Method as defined in claim 1 wherein said monomeric oxirane monoepoxide is a member selected from the group consisting of epihalohydrins, olefin oxides, and epoxy alkyl ethers of the structural formula:

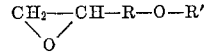

wherein R' is a hydrocarbon radical and R is a saturated, aliphatic hydrocarbon radical.

14. Method as defined in claim 3 wherein the said water is used in amounts of from about 0.75 to about 1 mole, per mole of the said organometallic compound.

15. Method for the production of a polymer of an epoxide compound which comprises contacting at a temperature of from about 0° C. to about 200° C. a monomeric oxirane monoepoxide, which is free of ester, acid, amino and aldehyde groups, which from about 0.01 to about 12 percent by weight, based on the weight of said monoepoxide, of an organometallic compound having the formula:

$$R_1\text{---}Me\text{---}R_2$$

wherein $R_1$ and $R_2$ are hydrocarbon radicals and Me is a metal of Group II of the Periodic Table, and with from about 0.01 to about 1.3 moles of water, per mole of said organometallic compound, whereby said oxirane monoepoxide polymerizes to form a polymer.

16. Method for the production of a polymer of an epoxide compound which comprises contacting at a temperature of from about 60° C. to about 175° C. a monomeric oxirane monoepoxide, which is free of ester, acid, amino and aldehyde groups, with from about 0.1 to about 3 percent by weight, based on the weight of said monoepoxide, of an organometallic compound having the formula:

$$R_1\text{---}Me\text{---}R_2$$

wherein $R_1$ and $R_2$ are hydrocarbon radicals and Me is a metal of Group II of the Periodic Table, and with from about 0.75 to about 1.3 moles of water, per mole of said organometallic compound, whereby said oxirane monoepoxide polymerizes to form a polymer.

17. Method for the production of a polymer of an epoxide compound which comprises contacting a monomeric oxirane monoepoxide which is free of ester, acid, amino and aldehyde groups, at a temperature of from about 0° C. to about 200° C., in the presence of an organic diluent with from about 0.01 percent by weight to about 12 percent by weight, based on the weight of said monoepoxide, of an organometallic compound having the formula:

$$R_1\text{---}Me\text{---}R_2$$

wherein $R_1$ and $R_2$ are hydrocarbon radicals having from 1 to 10 carbon atoms and being free of olefinic and acetylenic unsaturation, and from about 0.01 to about 1.3 moles of water, per mole of said organometallic compound whereby said oxirane monoepoxide polymerizes to form a polymer.

18. Method as defined in claim 17 wherein the said oxirane monoepoxide is polymerized at a temperature of from about 60° C. to about 175° C.

19. Method as defined in claim 17 wherein the said organometallic compound is used in an amount of from about 0.1 to about 3 percent by weight based on the weight of the said monoepoxide.

20. Method as defined in claim 18 wherein the said water is used in an amount of from about 0.75 to about 1 mole, per mole of said organometallic compound.

21. Method as defined in claim 17 wherein the said water is used in an amount of 1 mole per mole of said organometallic compound.

22. Method for the production of a solid polymer of an epoxide compound which comprises contacting under polymerizing conditions a monomeric oxirane monoepoxide free of interfering functional groups with a polymerization catalyst consisting of a dialkyl zinc compound and water wherein the water is present in an amount of about 0.2 to about 1.2 moles per mole of the dialkyl zinc compound.

23. Method for the production of a solid polymer of an epoxide compound which comprises contacting a monomeric oxirane monoepoxide free of interfering functional groups with a polymerization catalyst consisting of (1) an organomagnesium compound of the formula $$R_1\text{---}Mg\text{---}R_2$$

where $R_1$ and $R_2$ are hydrocarbon radicals free of olefinic and acetylenic unsaturation and (2) water, wherein the water is present in an amount of 0.02 to 1.3 moles per mole of organomagnesium compound.

References Cited

UNITED STATES PATENTS 2,870,100  1/1959  Stewart et al. _____ 260—2

FOREIGN PATENTS 477,843  1/1938  Great Britain.
220,517  2/1959  Australia.

OTHER REFERENCES

Furukawa et al.: (II) Journal of Polymer Science, vol. 36, pages 541–3 (April 1959).

Furukawa et al.: (I) Die Makromolekulaee, vol. 32, pages 90–94 (July 1959).

Pen: "High Polymeric Chemistry," page 29, Chapman and Hall Ltd., London, 1949.

Flory: "Principles of Polymer Chemistry," pages 40 and 59, specially relied on, Cornell University Press, New York, 1953.

WILLIAM H. SHORT, *Primary Examiner.*

T. PERTILLA, *Assistant Examiner.*